United States Patent [19]

Whitney et al.

[11] Patent Number: 5,131,745
[45] Date of Patent: Jul. 21, 1992

[54] METHOD AND APPARATUS FOR ALIGNING THE OPTICAL AXIS OF A FIBER OPTIC ELEMENT WITH THE AXIS OF ROTATION

[75] Inventors: Daniel E. Whitney, Arlington; Richard W. Metzinger, Lynnfield; J. Kevin Champagne, Cambridge, all of Mass.

[73] Assignee: The Charles Stark Draper Lab., Inc., Cambridge, Mass.

[21] Appl. No.: 608,256

[22] Filed: Nov. 2, 1990

[51] Int. Cl.⁵ .............................................. G02B 6/38
[52] U.S. Cl. ...................................... 356/153; 385/25; 385/53; 385/139
[58] Field of Search ............... 356/153, 138, 152, 73.1; 350/96.2, 96.15, 96.21; 51/121, 216, 319, 237 T; 250/227.24, 227.11

[56] References Cited

U.S. PATENT DOCUMENTS

| | | | |
|---|---|---|---|
| 3,938,895 | 2/1976 | Bridger et al. | 350/96.2 |
| 4,193,664 | 3/1980 | Ellwood | 350/96.21 |
| 4,523,802 | 6/1985 | Sakaguchi et al. | 350/96.2 |
| 4,563,087 | 1/1986 | Bourbin et al. | 356/73.1 |
| 4,678,271 | 7/1987 | Beaulieu | 350/96.2 |
| 4,721,357 | 1/1988 | Kovalchick et al. | 350/96.2 |
| 4,754,576 | 7/1988 | Liddell et al. | 51/165.72 |
| 4,784,454 | 11/1988 | Dyott | 350/96.2 |
| 4,832,438 | 5/1989 | Engel et al. | 350/96.2 |

Primary Examiner—Samuel A. Turner
Assistant Examiner—Richard E. Kurtz, II
Attorney, Agent, or Firm—Iandiorio & Dingman

[57] ABSTRACT

A positioning technique for grinding a conical tip on a fiber optic element includes rotatably mounting an end of the fiber optic element to be conically ground; detecting orbital motion of the optical axis of the fiber optic element about the mechanical axis of rotation; and adjusting the optical axis relative to the axis of rotation to minimize the orbital motion of the optical axis.

22 Claims, 6 Drawing Sheets

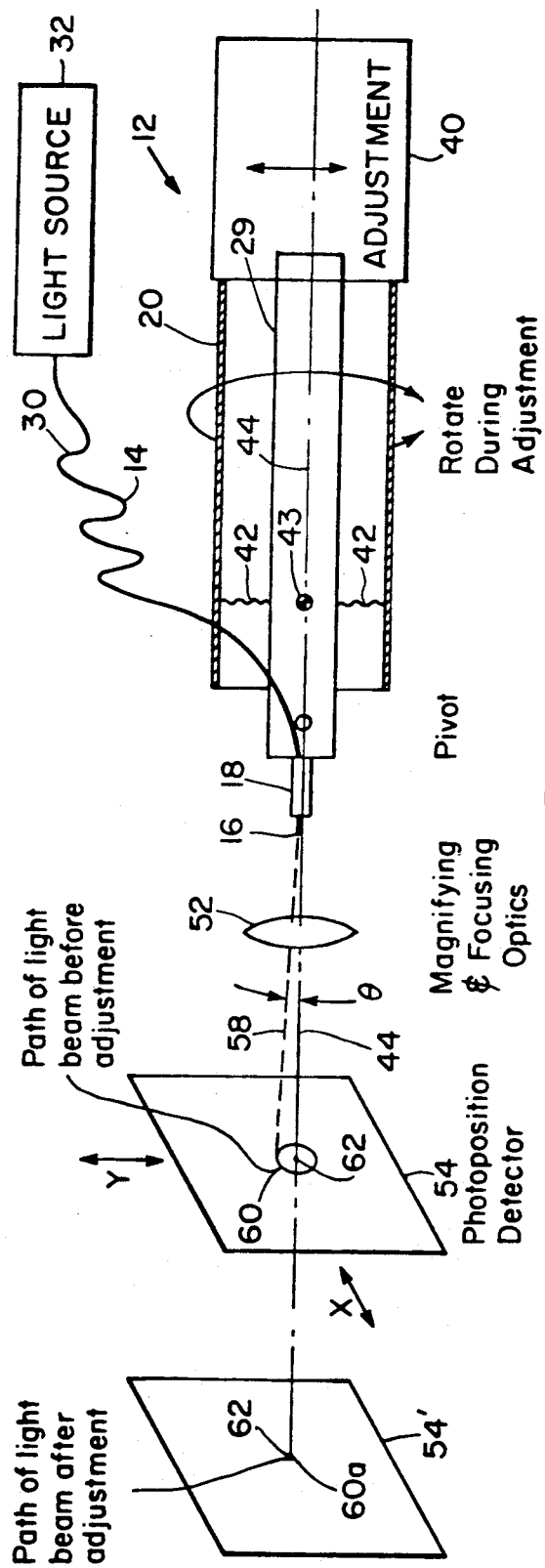
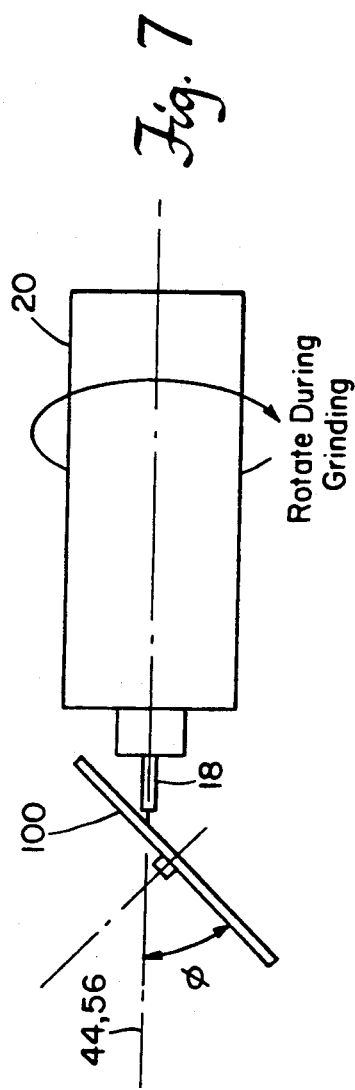

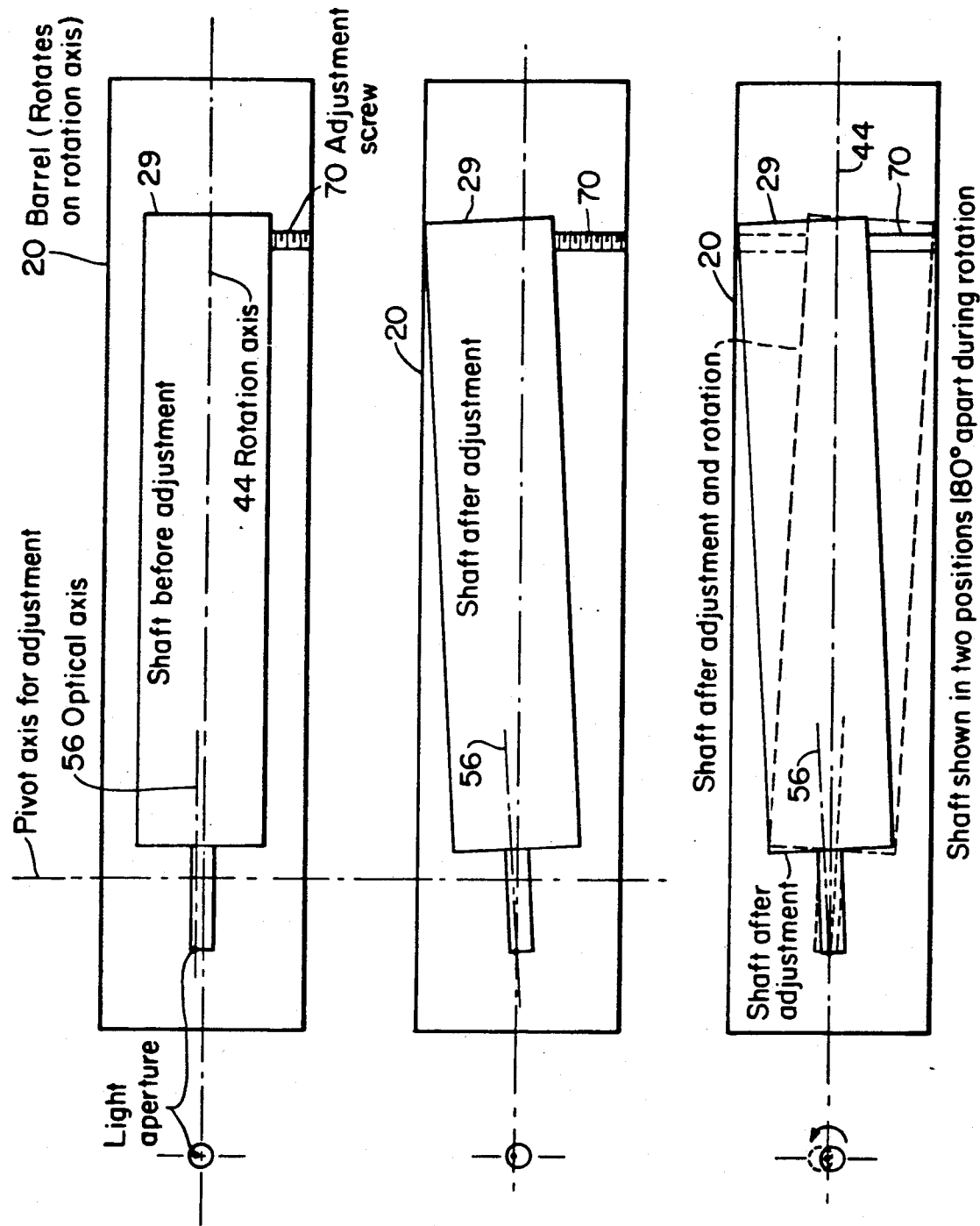

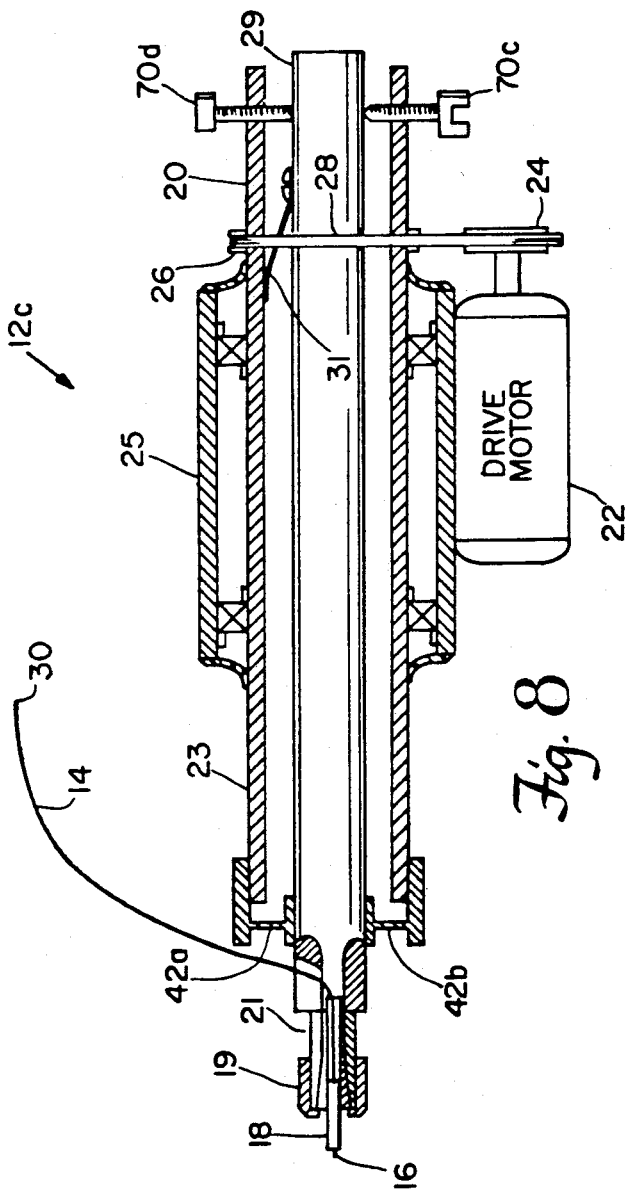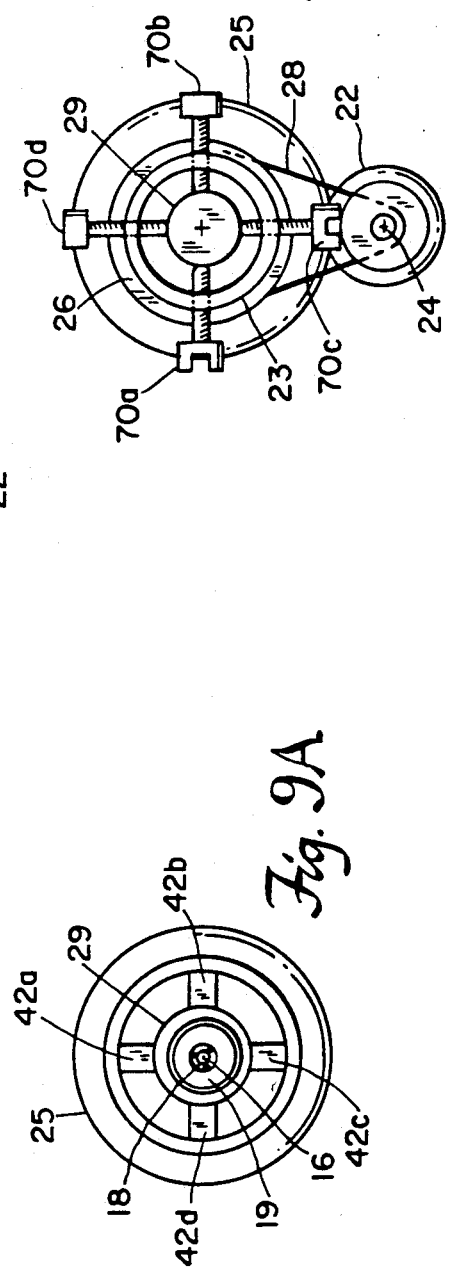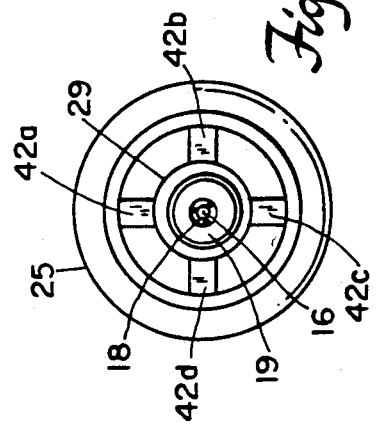

METHOD AND APPARATUS FOR ALIGNING THE OPTICAL AXIS OF A FIBER OPTIC ELEMENT WITH THE AXIS OF ROTATION

FIELD OF INVENTION

This invention relates to a method and system for aligning the optical axis of a fiber optic element with the axis of rotation especially for enabling proper grinding of a conical tip on the element, and more particularly to such a method and system which aligns those axes by identifying and then reducing the radius of orbital motion of the optical axis about the axis of rotation.

BACKGROUND OF INVENTION

It is often necessary to interface an optical fiber element with an extremely small laser so that light from the laser will enter the element with as little as possible loss due to reflection. For this purpose the optical aperture of the element must be aligned with the laser within $\pm 1\mu$ normal to the end and $8\mu$ axially away from the laser. It has been determined that a tapered end on the element facilitates the coupling efficiency; a preferred taper is effected with a conical tip of 140° to 150°, for example. One technique for applying a taper is to heat and draw the tip but this achieves a narrow angle at best, well under 150°. One technique for producing a conical tip with a large enough incident angle is grinding. But an optical fiber element is typically only 0.003 inch in diameter and the light actually only passes through a center section of the element about $8\mu$ in diameter. The problem in grinding is that the geometric axis of the conical end must coincide with optical axis of the fiber optic element within about $1\mu$. The optical axis is by definition the center of a light beam exiting the aperture and must be found experimentally. Its location within the 0.003 inch structure cannot be predicted within the required $1\mu$ accuracy. Thus the grinding method must include means to determine the location of this axis and then grind the cone onto the fiber centering the cone on this axis.

SUMMARY OF INVENTION

It is therefore an object of this invention to provide an improved method and system for aligning the axis of rotation and optical axis of a fiber optic element especially in preparation for grinding a conical tip on the element.

It is a further object of this invention to provide such an improved method and system which is reliable, accurate and simple in design and use.

It is a further object of this invention to provide such an improved method and system which facilitates grinding at any desired conical tip angle and without complex or difficult procedures or equipment.

It is a further object of this invention to provide such an improved method and system which enables quick and easy alignment of the optical and rotation axes automatically or manually.

The invention results from the realization that a truly accurate positioning of an optical fiber element for grinding can be achieved by minimizing the orbit of the optical axis about the rotational axis of the fiber optic element.

This invention features a method and system for aligning the optical axis of a fiber optic element with the axis of rotation especially for the purpose of enabling proper grinding of a conical tip on the element. The system employs means for rotatably mounting an end of a fiber optic element to be conically ground; means for detecting orbital motion of the optical axis of the fiber optic element about the mechanical axis of rotation; and means for adjusting the optical axis relative to the axis of rotation to minimize the orbital motion of the optical axis.

In a preferred embodiment, the means for detecting may include means for introducing light into one end of the element to be ground and means responsive to the light exiting the other end of the element for indicating the orbital motion of the optical axis about the axis of rotation. The means for rotatably mounting may include flexible support means and the means for adjusting may include means for shifting the optical axis of the tip of the element to be ground relative to the rotation axis. Means for shifting may include screw means for moving the optical axis in two dimensions.

The means for introducing light may introduce the light into the distal end of the fiber optic element, and the means for indicating may include means responsive to the light exiting the end of the element to be ground for resolving the displacement between the optical axes and the axis of rotation. The means for indicating may include means responsive to the displacement for driving the means for adjusting to reduce the displacement. The means for indicating may include visual display means.

The means for introducing light may introduce light into the end to be ground of the fiber optic element, and the means for indicating may include means for sensing the intensity of the light exiting from the distal end of the element representative of the orbital distance of the optical axis from the axis of rotation.

The means for indicating may include means responsive to the intensity representative of the orbital displacement for driving the means for adjusting to reduce the displacement. The means for indicating may include visual display means, and there may be grinding means for grinding the tip of the fiber optic element after the orbital motion has been minimized.

More comprehensively, the invention refers to a positioning system for a device for grinding a conical tip coaxial, or as nearly as possible coaxial, with the optical axis of the fiber optic element. There are means for rotatably mounting an optical fiber element end to be conically ground about a mechanical axis of rotation and means for introducing light into one end of the fiber optic element. There are means for sensing the light exiting from the other end of the fiber optic element and means for flexibly mounting the end of the fiber optic element to be ground. Means responsive to the light exiting the other end of the fiber optic element indicates the orbital motion of the optical axis about the axis of rotation. There are means for adjusting the orientation of the end of the fiber optic element to be ground to reduce the orbit of the optical axis about the axis of rotation.

The invention also features system for grinding a conical tip of a fiber optic element coaxial with the optical axis of the element, which includes the positioning system and/or method.

The invention also features a method of positioning the tip of a fiber optic element for grinding. The end of the fiber optic element to be ground is rotated about a mechanical axis. The orbital motion of the optical axis about the axis of rotation is detected and the orientation of the optical axis is adjusted to minimize the orbital motion of the optical axis. At this point the tip of the element may be ground.

The step of detecting the orbital motion may include introducing light into one end of the element to be ground and sensing the light exiting from the other end representative of the orbital distance of the optical axis relative to the axis of rotation. This may be accomplished by introducing light into the distal end of the element and sensing it at the end to be ground for resolving the displacement between the optical axis and the axis of rotation. Or, the light may be introduced into the end of the element to be ground and the intensity of the light may be sensed at the distal end as a representation of the orbital distance between the two axes.

DISCLOSURE OF PREFERRED EMBODIMENT

Other objects, features and advantages will occur to those skilled in the art from the following description of a preferred embodiment and the accompanying drawings, in which.

Figure 1:
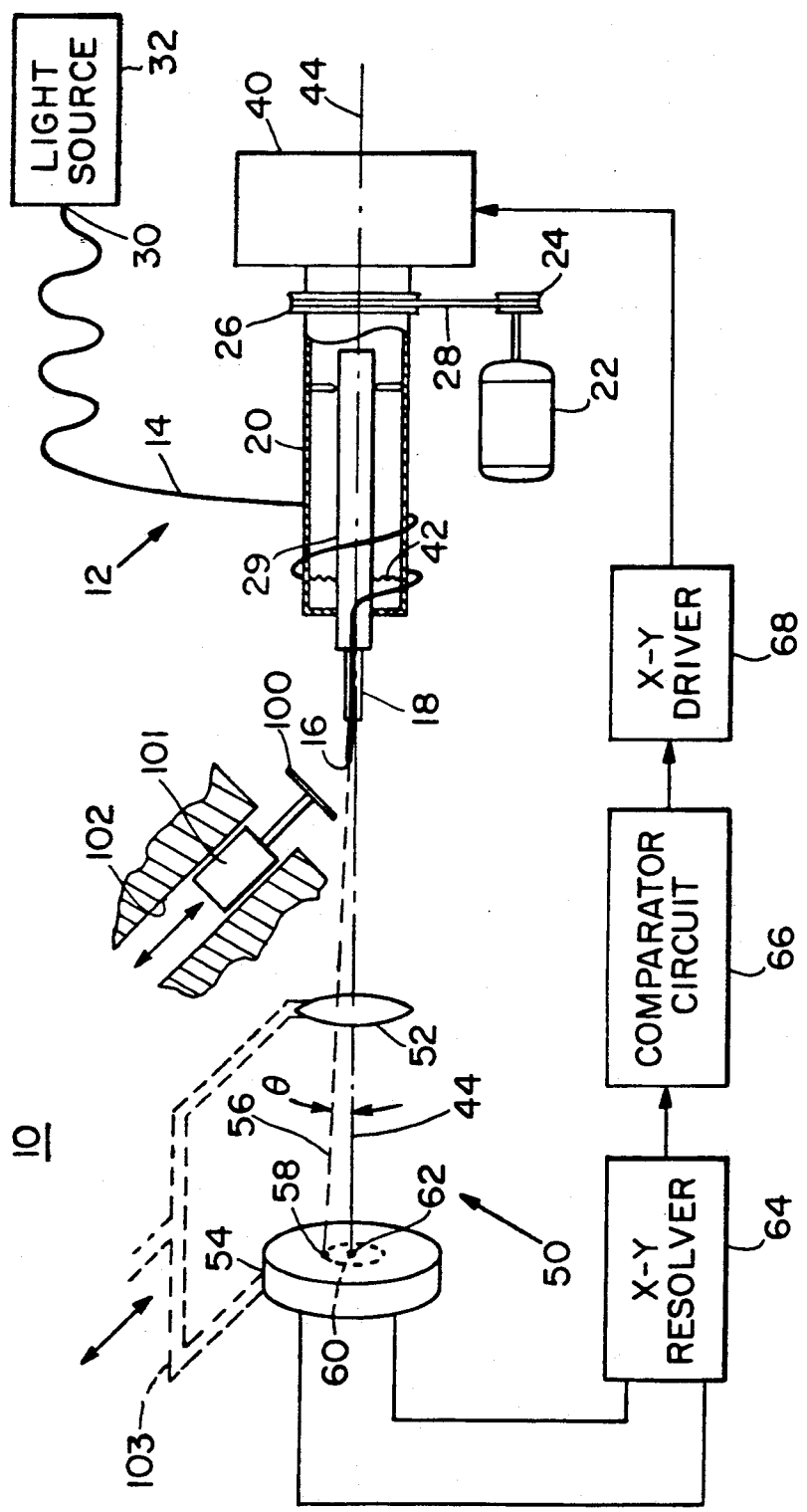
FIG. 1 is a schematic block diagram of a positioning system for automatically aligning the optical axis and axis of rotation of a fiber optic element and grinding a conical tip on the element.

FIGS. 6A, B, C and D and FIG. 7 illustrate the method of positioning the fiber optic element for grinding by minimizing the orbital motion of the optical axis about the axis of rotation and the subsequent grinding respectively;

FIG. 8 is a schematic cross-sectional diagram of a positioning system according to this invention; and FIGS. 9A and 9B are front and rear elevational views, respectively, of the system of FIG. 8.

The method and apparatus of this invention may involve mechanical grinding of the fiber. This is done by embedding the fiber for convenience in a larger diameter tube called a ferrule. This ferrule is made of material similar to that of the fiber and parts of the ferrule are ground at the same time as the fiber is ground.

The ferrule is held in a collett or chuck while its end is in contact with a grinding disk. The disk spins and the ferrule is slowly rotated so that every aspect of its end comes into contact with the disk. Eventually a cone end is formed on the ferrule and on the end of the fiber. A feature of the invention is the preliminary adjustment by which the axis of rotation of the ferrule and and fiber optic element is made coincident with the optical axis of the fiber.

The adjustment technique uses a lever supported by semi-rigid flexures and adjusted by fine thread screws. The advantages include no backlash and positive adjustment. A set of double eccentrics could also be used but hysteresis and backlash are possible.

The invention in one implementation can be accomplished as follows. Glue or otherwise firmly fasten the fiber into the ferrule. If necessary, cleave the end of the fiber where it exits the ferrule on one end and grind the cleaved end flat and normal to the ferrule axis. Mount the ferrule with the cleaved end exposed in a rotating adjustable apparatus. Shine a light into the other end of the fiber, rotate the apparatus and adjust the location of the cleaved end until the orbital radius of the light beam exiting from the cleaved end is effectively reduced to zero; or shine the point of a focussed beam of light at the protruding cleaved end of the fiber, rotate the apparatus and adjust the location of the end until a constant amount of light is detected at the other end of the fiber throughout 360° of rotation, indicating a zero orbit radius of the optical axis about the axis of rotation. Apply the spinning grinding disk to the end of the ferrule at the desired angle and slowly rotate the ferrule, gently pressing it into the wheel and forming a conical end on the fiber optic element. Keep the fiber in the ferrule after grinding and use the ferrule as part of the mounting bracket of the fiber.

Note that it is not necessary to stop the grinding process at any particular point or with any particular accuracy. The only place in this process where accuracy is needed is in aligning the optical and rotational axes. This is an important feature of the invention. It is done before any grinding and can be rechecked as often as desired.

If the fiber optic element is polarized, then either after cleaving (and grinding the end flat) or after final conical grinding, the axis of polarization is found by shining polarized light into the end and turning the ferrule until a maximum of transmitted light is detected at the other end of the fiber. The ferrule is then marked to indicate the desired orientation, say by grinding a flat on one side parallel to the plane of polarization, so that the ferrule may simply be placed down on this flat in the final assembled position next to the laser. If each laser has its own unique polarization axis then this step must be done in conjunction with the particular laser to which the fiber will be interfaced.

There is shown in FIG. 1 an alignment system 10 according to this invention which includes a rotation unit 12 for holding fiber optic element 14 and an adjustment unit 40 for adjusting the position of element 14 whose end to be ground 16 is held in ferrule 18 and is supported by barrel 20 rotated by motor 22 by means of pulleys 24, 26 and belt 28. The distal end 30 of fiber optic element 14 is connected to a light source 32. Flexible members 42 allow the adjustment unit 40 to shift the axis of rotation 44 of the tip 16 in accordance with the action of adjustment unit 40. In this manner the optical axis is adjusted with respect to the axis of rotation as the tip is adjusted with respect to the rotation axis.

A detection circuit 50 includes an optical means such as lens 52 for focusing on sensor 54 the light from light source 32 which emanates from the end 16 of fiber optic 14. Displacement between the mechanical axis of rotation 44 and the optical axis 56 causes the light striking sensor 54 at 58 to orbit in the path 60 about the point 62 where axis 44 encounters sensor 54. Sensor 54 may be a photoposition sensor. The position 58 of optical axis 56 on sensor 54 is determined by X-Y resolver circuit 64, which delivers that to comparator circuit 66, where that position is compared with the optimum position 62 of the axis of rotation 44. The difference is provided in a signal to X-Y driver 68, which then operates adjustment unit 40 to shift the tip 16 of fiber optic element 14 to reduce the radius of orbit of tip 16 and bring the optical axis 56 into line with the rotation axis 44.

Figure 2:
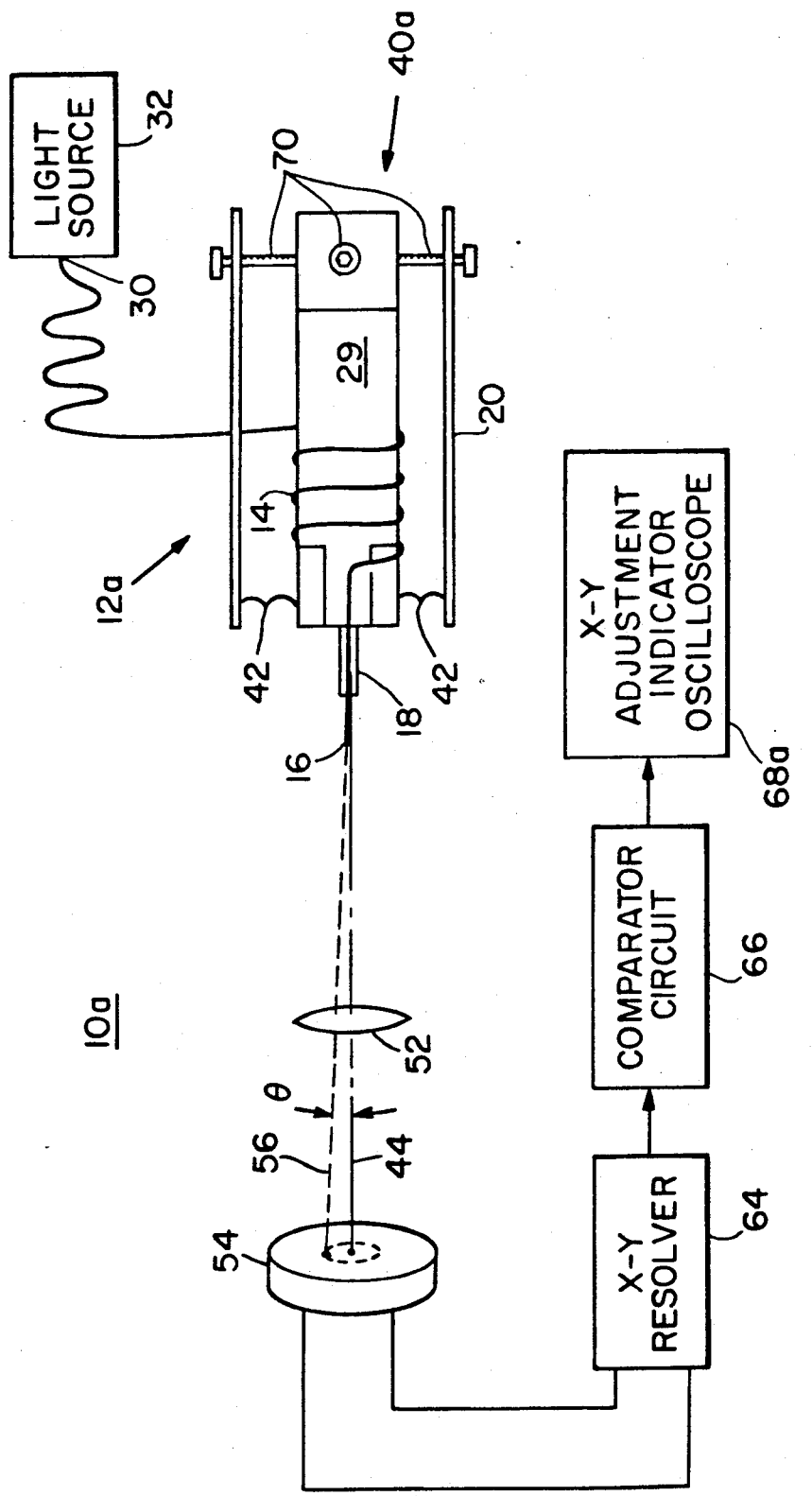
FIG. 2 is a view similar to FIG. 1 which enables manual adjustment of the axes.

The displacement angle $\theta$ between the optical axis 56 and axis of rotation 44 may also be reduced manually, as shown in FIG. 2, where in system 10a, comparator circuit 66 provides a signal to an X-Y adjustment indicator 68a, which may be an oscilloscope or a digital readout which a human operator may utilize to understand the nature and extent of the misalignment of the optical axis 56 and axis of rotation 44. The human operator then adjusts the four X and Y screws 70, only three of which are visible in FIG. 2, to shift the end 16 of fiber optic element 14 about as permitted by flexures 42, which also may be four in number although only two are shown in FIG. 2.

Figure 3:
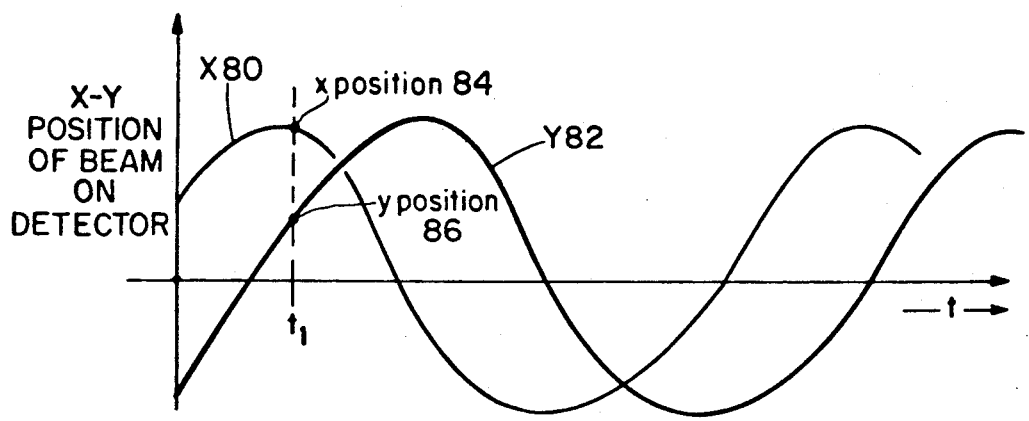
FIG. 3 is an illustration of the variation in position of the orbiting optical axis in the systems of FIGS. 1 and 2 while the optical axis is being rotated about the rotation axis.

Sensor 54 in FIGS. 1 and 2 may be a photoposition sensor, Model SC/10D, made by United Detector Technology, Inc., which provides two outputs to identify the position of the light beam including an X position signal 80, FIG. 3, and a Y position signal 82. At any given point $t_1$ in time the X position 84 and Y position 86 may be easily determined by resolver 64, FIGS. 1 and 2, which performs a simple trigonometric calculation familiar to those versed in the art of resolvers.

Figure 4:
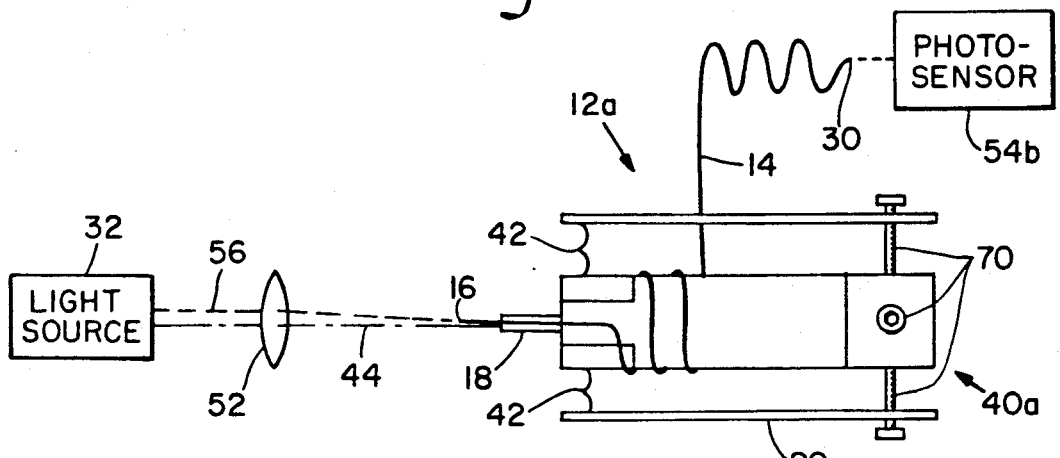
FIG. 4 is a schematic block diagram similar to that shown in FIGS. 1 and 2 with the light path reversed.
Figure 5:
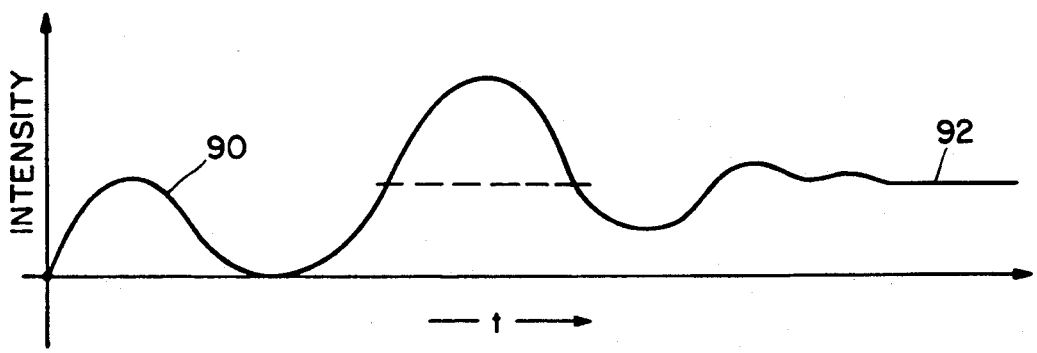
FIG. 5 is an illustration of the variation in intensity representative of the orbital motion of the optical axis in the system of FIG. 4.

Although in FIGS. 1, 2 and 3 the light source is delivered to the distal end 30 and exits from the end to be ground 16 of fiber optic element 14, this is not a necessary limitation of the invention. For example, as shown in FIG. 4, light source 32 may be positioned to provide light input through the optical elements 52 into the end 16 of fiber optic element 14, and sensed by a photosensor 54b at the distal end 30 of fiber optic element 14. In this instance, photosensor 54b does not need to be able to resolve the position of the light striking it, only the intensity. For as the rotation unit 12a rotates and the optical axis wobbles or orbits about the mechanical axis of rotation, the intensity will fluctuate as indicated by intensity characteristic 90, FIG. 5. Screws 70 are then adjusted to minimize the orbiting action of the optical axis until the intensity level flattens out as indicated at section 92 of waveform 90. The motor, pulleys and belts have been omitted in FIGS. 2, 4, 6 and 7 for the sake of clarity. The rotation required to identify the orbital displacement and adjust it to a minimum may be a very slow rotation and may only require one or two revolutions. After that, a continuous higher speed of rotation is employed for grinding.

The method of the invention can be understood with respect to FIG. 6A, where initially with light source 32 providing light into the distal end 30 of fiber optic element 14, a beam of light exiting from the end 16 to be ground is focussed by optics 52 onto a photoposition detector 54, where due to the misalignment by the angle between the mechanical axis of rotation 44 and the optical axis 56 the beam describes an orbit 60 about the location of the mechanical axis of rotation 62. Using the adjustment unit 40 or screws 70, the shaft 29 is tilted inside barrel 20 around virtual center 43 as permitted by flexures 42 until the axes 56 and 44 coincide, reducing the displacement angle $\theta$ virtually to zero so that the path 60 of the light beam on the face of sensor 54 after adjustment 60a is essentially a point coincident with the mechanical axis of rotation 62 shown on the phantomed photoposition detector 54'. This sequence is illustrated in FIGS. 6B, C and D. At this point a grinding disk 100 can be brought into contact with ferrule 18 and the grinding begun, as shown in FIG. 7, and the tip can be ground to any desired angle $\phi$. Grinding disk 100 and its drive motor 101 may be mounted in a guide 102, FIG. 1, for selective positioning into and out of contact with ferrule 18 and tip 16. Similarly, sensor 54 and optic 52 may be mechanically coupled and moved in and out as a unit in guide 13, FIG. 1, so that they may be removed during the grinding operation and only be present as necessary during the alignment positioning.

In one construction, as shown in FIG. 8, the tip 16 of fiber optic element 14 embedded in ferrule 18 is gripped in a collett or chuck 19 which has a passage for fiber optic element 14 which may be then wound around barrel 20 in the area 23. Barrel 20 is mounted in bearing 25 which is fixed to motor 22. The four adjusting screws 70 may actually include two screws in the X dimension, FIG. 9B: an adjusting screw 70a and a locking screw 70b; and two screws in the Y dimension: an adjusting screw 70c and a locking screw 70d. Screws 70a-d bear on shaft 29 to adjust the position of tip 16 in ferrule 18. Spring 31 may be used to provide a centering bias in the Y direction and a similar spring, not shown, may be used in the X direction. A lever arm ratio of 10:1 and screws with 100 threads per inch provide a shift of 1$\mu$ for each 14° of rotation of the screw.

The flexures 42 which permit the tilting of shaft 29 to effect the alignment of the two axes are shown, FIG. 9A, as being four in number, 42a, 42b, 42c and 42d.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. Positioning apparatus for a device for grinding a conical tip on a fiber optic element, comprising:
   means for rotatably mounting an end of a fiber optic element to be conically ground;
   means for detecting orbital motion of the optical axis of the fiber optic element about the mechanical axis of rotation; and
   means, responsive to said means for detecting, for adjusting the optical axis relative to the axis of rotation to minimize the orbital motion of the optical axis.

2. The positioning apparatus of claim 1 in which said means for detecting includes means for introducing light into one end of said element to be ground and means, responsive to the light exiting the other end of said element, for indicating the orbital motion of the optical axis about the axis of rotation.

3. The positioning apparatus of claim 1 in which said means for rotatably mounting includes flexible support means.

4. The positioning apparatus of claim 1 in which said means for adjusting includes means for shifting the optical axis of the tip of said element to be ground relative to said rotation axis.

5. The positioning apparatus of claim 4 in which said means for shifting includes screw means for moving said optical axis in two dimensions.

6. The positioning apparatus of claim 2 in which said means for introducing introduces light into the distal end of said fiber optic element and said means for indicating includes means, responsive to the light exiting from the end of the element to be ground, for resolving the displacement between said optical axis and said axis of rotation.

7. The positioning apparatus of claim 6 in which said means for indicating includes means, responsive to said displacement, for driving said means for adjusting to reduce said displacement.

8. The positioning apparatus of claim 6 in which said means for indicating includes visual display means.

9. The positioning apparatus of claim 2 in which said means for introducing introduces light into the end to be ground of said fiber optic element and said means for indicating includes means for sensing the intensity of the light exiting from the distal end of the element representative of the orbital distance of the optical axis from the axis of rotation.

10. The positioning apparatus of claim 9 in which said means for indicating includes means, responsive to the intensity representative of the orbital displacement, for driving said means for adjusting to reduce the displacement.

11. The positioning apparatus of claim 9 in which said means for indicating includes visual display means.

12. The positioning apparatus of claim 1 further including grinding means for grinding the tip of said fiber optic element.

13. Positioning apparatus for a device for grinding a conical tip coaxial with the optical axis of a fiber optic element, comprising:
 means for rotatably mounting an optical fiber element end to be conically ground about a mechanical axis of rotation;
 means for introducing light into one end of the fiber optic element;
 means for sensing, in a single phase, the light exiting the other end of the fiber optic element;
 means for flexibly mounting the end of the fiber optic element to be ground;
 means, responsive to the light exiting the other end of the fiber optic element, for indicating the orbital motion of the optical axis about the axis for rotation; and
 means, responsive to said means for indicating, for adjusting the orientation of the end of the fiber optic element to be ground to reduce the orbit of the optical axis about the axis of rotation.

14. Apparatus for grinding a conical tip on a fiber optic element coaxial with the optical axis of the element, comprising:
 means for rotatably mounting an optical fiber element end to be conically ground about a mechanical axis of rotation;
 means for introducing light into one end of the fiber optic element;
 means for sensing, in a single plane, the light exiting the other end of the fiber optic element;
 means for flexibly mounting the end of the fiber optic element to be ground;
 means, responsive to the light exiting the other end of the fiber optic element, for indicating the orbital motion of the optical axis about the axis of rotation;
 means, responsive to said means for indicating, for adjusting the orientation of the end of the fiber optic element to be ground to reduce the orbit of the optical axis about the axis of rotation; and
 means for grinding the tip of said fiber optic element in said means for rotatably mounting.

15. A method of positioning the tip of a fiber optic element for grinding, comprising:
 rotatably mounting a fiber optic element to be conically ground;
 rotating about a mechanical axis of rotation the end of said fiber;
 detecting the orbited motion of the optical axis about the axis of rotation; and
 adjusting the optical axis, in response to the detected orbital motion, to minimize the orbital motion of the optical axis.

16. The method of claim 15 further including grinding the tip of the element after the orbited motion has been minimized.

17. The method of claim 15 in which detecting the orbited motion includes introducing light into one end of the element to be ground and sensing the light exiting from the other end representative of the orbit distance of the optical axis relative to the axis of rotation.

18. The method of claim 17 in which the light is introduced into the distal end of the element and sensed at the end of the element to be ground for resolving the displacement between the optical axes and the axis of rotation.

19. The method of claim 17 in which the light is introduced into the end of the element to be ground and at the distal end of the element its intensity representative of orbital distance is sensed.

20. A method of positioning the tip of a fiber optic element for grinding, comprising:
 securing an end portion of the fiber optic element within a tube;
 rotatably mounting the tube encased fiber optic element, the tip of which fiber is to be ground;
 rotating the tube encased fiber optic element about a mechanical axis of rotation;
 detecting, in a single plane, the orbital motion of the optical axis, for the tube encased fiber element, about the axis of rotation by introducing light into one end of the element to be ground and sensing the light exiting from the other end representative of the orbit distance of the optical axis relative to the axis of rotation; and
 adjusting the orientation of the end of the fiber optic element to be ground to minimize the orbit of the optical axis about the axis of rotation in response to the detected orbital motion of the optical axis about the axis of rotation.

21. Positioning apparatus for a device for grinding a conical tip on a fiber optic element, comprising:
 a tube for encasing and securing an end portion of the fiber optic element, where the tip of said end portion is to be ground;
 a chuck assembly for rotatably gripping the tube encased end portion of the fiber optic element;
 means for rotating the chuck assembly;
 means for introducing light into one end of the fiber optic element;
 means, responsive to the light exiting the other end of the element, for indicating the orbital motion of the optical axis for the element, in a single plane, about the axis of rotation; and
 means, responsive to said means for indicating, for adjusting the orientation of the end of the element to be ground to minimize the orbit of the optical axis about the axis of rotation.

22. Apparatus for grinding a conical tip on a fiber optic element coaxial with the optical axis of the element, comprising:
 a tube for encasing and securing an end portion of the fiber optic element, where the tip of said end portion is to be ground;

a chuck assembly for rotatably gripping the tube encased end portion of the fiber optic element;

means for rotating the chuck assembly;

means for introducing light into one end of the fiber optic element;

means, responsive to the light exiting the other end of the element, for indicating the orbital motion of the optical axis for the element, in a single plane, about the axis of rotation;

means, responsive to said means for indicating, for adjusting the orientation of the end of the element to be ground to minimize the orbit of the optical axis about the axis of rotation; and means for grinding both the tube and the tip of the fiber optic element in said chuck assembly, while being rotated, to produce a conical tip on the element.

* * * * *